(12) United States Patent
Conner (10) Patent No.: US 7,147,332 B2
(45) Date of Patent: Dec. 12, 2006

(54) PROJECTION SYSTEM WITH SCROLLING COLOR ILLUMINATION

(75) Inventor: Arlie R. Conner, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/895,705

(22) Filed: Jul. 21, 2004

(65) Prior Publication Data

US 2006/0017891 A1    Jan. 26, 2006

(51) Int. Cl.
G03B 21/14    (2006.01)

(52) U.S. Cl. .............................. 353/81; 353/31; 353/34; 349/5

(58) Field of Classification Search .................. 353/31, 353/33, 34, 37, 81; 359/211, 638, 639, 640, 359/634; 348/742, 743, 771; 349/5, 6, 7, 349/8, 9
See application file for complete search history.

(56) References Cited

U.S. PATENT DOCUMENTS

| | | | |
|---|---|---|---|
| 4,870,268 A | 9/1989 | Vincent et al. | |
| 5,428,467 A | 6/1995 | Schmidt | |
| 5,548,347 A * | 8/1996 | Melnik et al. ............... | 348/761 |
| 5,781,251 A | 7/1998 | Otto | |
| 5,845,981 A * | 12/1998 | Bradley ........................ | 353/31 |
| 5,892,623 A | 4/1999 | Bradley | |
| 5,986,793 A | 11/1999 | Yamaguchi et al. | |
| 6,111,618 A | 8/2000 | Booth et al. | |
| 6,266,105 B1 | 7/2001 | Gleckman | |
| 6,330,112 B1 | 12/2001 | Kaise et al. | |
| 6,334,685 B1 | 1/2002 | Slobodin | |
| 6,493,149 B1 * | 12/2002 | Ouchi ......................... | 359/634 |
| 6,508,554 B1 | 1/2003 | Hatakeyama et al. | |
| 6,540,362 B1 * | 4/2003 | Janssen ....................... | 353/31 |
| 6,739,723 B1 * | 5/2004 | Haven et al. ................. | 353/20 |
| 6,827,450 B1 * | 12/2004 | McGettigan et al. .......... | 353/31 |
| 6,831,789 B1 * | 12/2004 | Chang ......................... | 359/634 |
| 2001/0038483 A1 | 11/2001 | Lambert | |
| 2002/0057402 A1 | 5/2002 | Um | |
| 2002/0159036 A1 | 10/2002 | Yamagishi et al. | |
| 2003/0020839 A1 | 1/2003 | Dewald | |
| 2003/0030913 A1 * | 2/2003 | Park et al. ................... | 359/634 |
| 2003/0095213 A1 | 5/2003 | Kanayama et al. | |
| 2003/0117591 A1 | 6/2003 | Stanton | |
| 2003/0142277 A1 | 7/2003 | Hatakeyama et al. | |
| 2003/0231159 A1 | 12/2003 | Dalal | |
| 2004/0056983 A1 | 3/2004 | Dean | |
| 2004/0263793 A1 * | 12/2004 | Kim et al. .................... | 353/33 |

FOREIGN PATENT DOCUMENTS

| | | |
|---|---|---|
| EP | 1 253 787 | 10/2002 |
| EP | 1 343 042 | 9/2003 |
| EP | 1 347 653 | 9/2003 |
| EP | 1 424 857 | 6/2004 |
| WO | WO03/015420 | 2/2003 |

* cited by examiner

Primary Examiner—William C. Dowling
(74) Attorney, Agent, or Firm—Anna A. Wetzel; George W. Jonas

(57) ABSTRACT

A projection system having an imager panel uses a scrolling prism assembly to illuminate different portions of the imager panel with light of different color simultaneously. The scrolling prism assembly can split light from a white light source into two or more different color bands that propagate through the scrolling prism in different directions, and it can reflectively combine the light so that the different color bands pass out of the scrolling prism assembly parallel. The scrolling prism assembly can also compensate for chromatic aberrations in the light received from the light source.

62 Claims, 7 Drawing Sheets

PROJECTION SYSTEM WITH SCROLLING COLOR ILLUMINATION

FIELD OF THE INVENTION

The invention relates to optical systems, and more particularly to projection display systems as might be used, for example, in projection televisions and the like.

BACKGROUND

Some optical imaging systems include a transmissive or a reflective imager panel, also referred to as a light valve or light valve array, which imposes an image on a light beam. Transmissive light valves are typically translucent and allow light to pass through. Reflective light valves, on the other hand, reflect only selected portions of the input beam to form an image. Reflective light valves provide important advantages, as controlling circuitry may be placed behind the reflective surface and more advanced integrated circuit technology becomes available when the substrate materials are not limited by their opaqueness. New potentially inexpensive and compact liquid crystal display (LCD) and digital light processor (DLP) projector configurations are becoming possible through the use of reflective microdisplays as the imager panel.

Projection systems typically use one or three imager panels. Single panel systems are often operated in a mode that is referred to as "field sequential color". In such a mode, a white light source is used to produce a beam of white light. A color filter, such as a color wheel, selectively filters the light so that only one color is incident on the imager panel at any one time. The imager panel is controlled to impose the image corresponding to incident color. The filter cycles through the colors, typically red, green and blue, with the imager panel synchronized to impose the image of the incident color of light. The net effect seen by the viewer is a full color image, even though only a single color is projected at any one time. The use of such a filter, however, generally results in about two-thirds of the light being discarded at any one time, since the lamp supplies white light but the imager panel is illuminated with only one color. Thus, single panel systems suffer from reduced efficiency.

One way common way of addressing this problem is to use three imager panels, each one associated with its own color band. As a result, each image panel can be illuminated continuously, and so the efficiency is increased relative to the single panel system. Three panel systems, on the other hand, are much more complex, require precise alignment among all the imager panels, and are more expensive due to the larger parts inventory. Thus, there remains a desire to obtain high efficiency operation of a simple projection system that uses fewer parts.

SUMMARY OF THE INVENTION

One exemplary embodiment of the present disclosure is directed to an image projection device that includes a rotatable prism arranged to receive light in different color bands, the light in different color bands being incident at the rotatable prism along respectively different light paths. An imager panel is disposed to receive light in the different color bands along the respectively different light paths simultaneously from the scrolling prism assembly. A reflective color combiner assembly is disposed on the different light paths between the scrolling prism assembly and the imager panel. The color combiner assembly receives light at an input side from the rotatable prism. Light passing from an output side of the reflective color combiner assembly towards the imager panel, and angular separations between the different light paths at the input side of the reflective color combiner assembly are different from angular separations between the different light paths at the output side of the reflective color combiner assembly.

Another exemplary embodiment of the present disclosure is directed to a method of illuminating an imager panel that includes passing light beams of different color bands along respectively different paths to a rotating prism; and transmitting the light beams of the different color bands through the rotating prism. The transmitted light beams in the different color bands are reflected through different angles so as to reduce angular separations between light beams of the different color bands. The imager panel is illuminated with the reflected light beams.

Another exemplary embodiment of the present disclosure is directed to an illumination system that includes an illumination source producing an output beam of light in different color bands; and a rotatable prism assembly arranged to receive light in the different color bands. The rotatable prism assembly includes a color splitting assembly to split the light into different light beams corresponding to the different color bands, and a rotatable prism disposed to receive the different color bands. A color combiner assembly receives the different light beams after passing through the rotatable prism and combines the different light beams to produce a combined beam. The output beam of light is subject to a wavelength-dependent aberration, and the rotatable prism assembly at least partially compensates for the wavelength-dependent aberration.

The above summary of the present disclosure is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics of some exemplary embodiments thereof have been shown by way of example in the drawings and will be described in detail. It should be understood, however, that the invention is not limited to the particular exemplary embodiments described. On the contrary, the intention is to cover all modifications, equivalents, and alternatives falling within the spirit and scope of the invention as defined by the appended claims.

DETAILED DESCRIPTION

The present invention is applicable to projection systems and is more particularly applicable to single panel projection systems that employ a scrolling prism for scrolling areas of different color on an imager panel.

One type of projection system according to the present disclosure uses a single imager panel illuminated with non-overlapping areas of light in different color bands. A schematic block representation of such a projection system 100 is presented in FIG. 1, in which an illumination source 102 generates light 104 that passes into a scrolling assembly 106. Scrolled light 108 from the scrolling assembly 106 is directed on to the imager panel 110. The image displayed by the imager panel 110 is controlled by a controller 111, for example a microprocessor or the like. The scrolled light 108 includes two or more areas of light in different color bands (shown in FIGS. 3A–3D), for example areas 112a–112c, which may be red, green and blue color bands. Image light 114 from the imager panel 110 is directed via a projection lens system 116 to a screen 118. The screen 118 may be a rear projection screen or a front projection screen.

Figure 1:
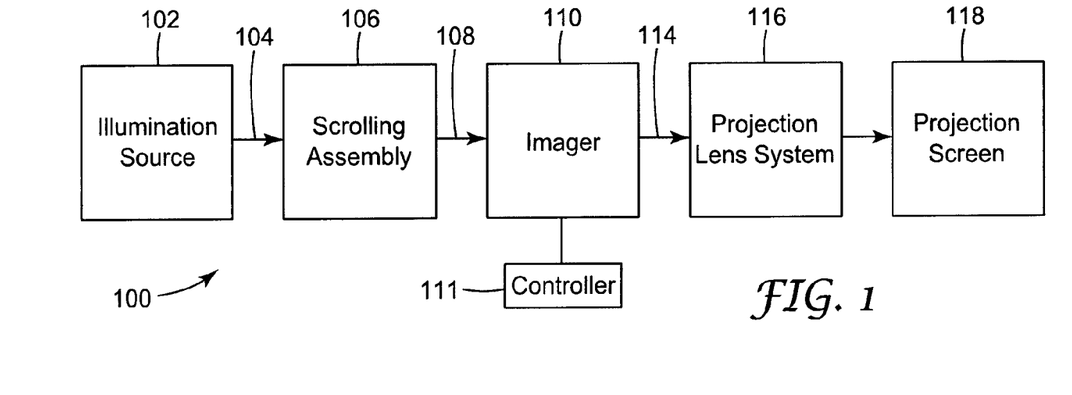
FIG. 1 schematically illustrates, in block format, different parts of an exemplary embodiment of a projection system according to principles of the present disclosure.

The imager panel 110 may be any suitable type of imager panel used for projecting color images, such as a liquid crystal imager panel or a digital light processor imager panel. Suitable liquid crystal imager panels include transmissive and reflective liquid crystal display panels, for example, liquid crystal on silicon (LCOS) and high temperature polysilicon LCD panels. Suitable digital light processor imager panels include arrays of mirrors rotatable between on and off positions, for example a DLP™-type imager panel as supplied by Texas Instruments, Dallas, Tex.

Figure 2A:
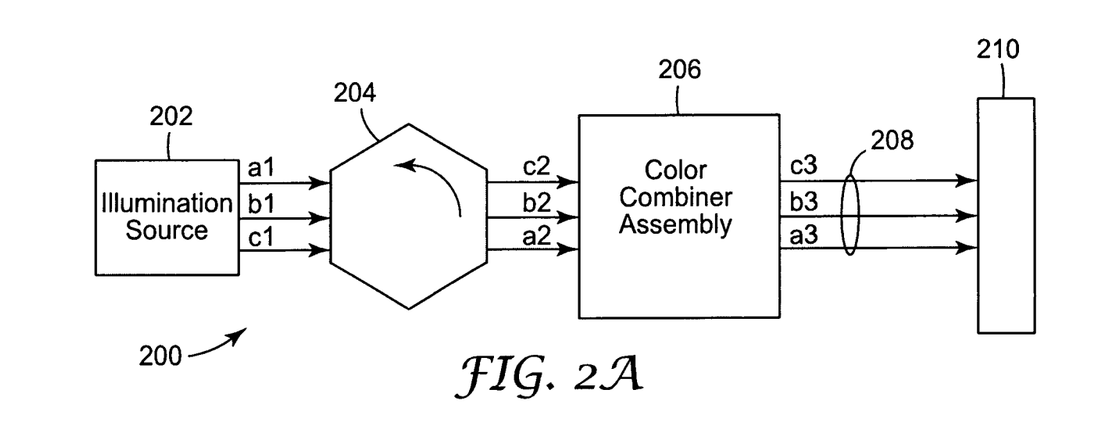
FIG. 2A schematically illustrates an exemplary embodiment of an illumination system according to principles of the present disclosure.

In one exemplary embodiment, schematically illustrated in FIG. 2A, the scrolling assembly includes a rotatable prism 204 and a color combiner assembly 206. In the illustrated exemplary embodiment, the projection system 200 includes an illumination source 202 that directs light in three different color bands along different light paths, labeled a1, b1, and c1, to the rotatable prism 204.

The different light paths a1, b1, and c1, input to the prism 204 lie non-parallel to each other, with the result that the light paths a2, b2, and c2 are also non-parallel to each other on exiting the prism 204 and, in some exemplary embodiments, on entering the color combiner assembly 206 after transmission through the prism 204. The angles between the light paths a3, b3 and c3 may be different, upon exiting from the color combiner assembly 206, from the angles between the light paths a2, b2 and c2 entering the color combiner assembly 206. In the illustrated embodiment, the angles between the light paths a3, b3, and c3 are less than the angles between light paths a2, b2 and c2, and the light paths a3, b3, and c3 may, in some exemplary embodiments, be parallel to each other. For example, in FIG. 2A, the light paths a3, b3, and c3 are shown to be parallel to, but separate from, each other. In the appropriate exemplary embodiments, the light paths a3, b3, and c3 may also be superimposed on each other. After passing out of the color combiner assembly 206, the light 208 passes to the imager panel 210.

Figure 3A:
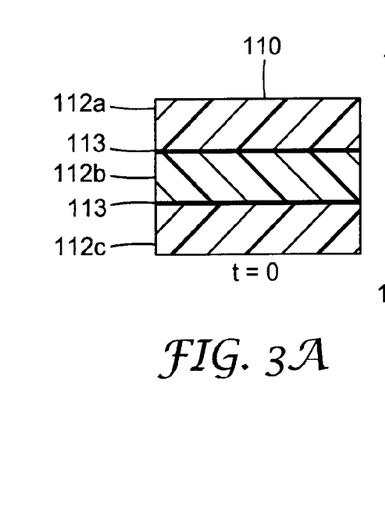
FIGS. 3A–3D schematically illustrate scrolling of bands of different color across an imager panel.
Figure 3B:
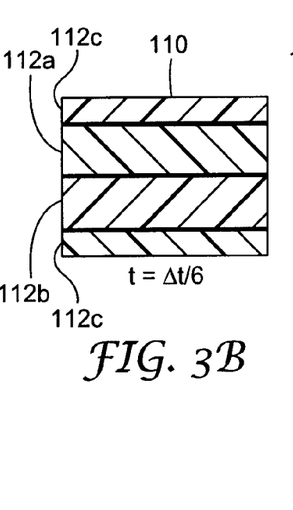
Figure 3C:
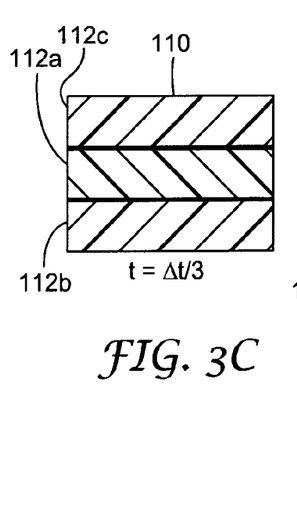

The scrolling of three differently colored areas down the imager panel is schematically illustrated in FIGS. 3A–3D. In FIG. 3A, the imager panel 110 is illuminated at a particular instant in time, t=0, from top to bottom with light in the first color band 112a, the second color band 112b and the third color band 112c. Dead spaces 113 may optionally separate the different areas illuminated by the different color bands 112a, 112b and 112c. At a time Δt/6 later, t=Δt/6, as shown in FIG. 3B, the color bands 112a and 112b have moved down the panel 110, and the color band 112c is split between the top and the bottom of the panel 110. After another interval of Δt/6, i.e. at t=Δt/3, as shown in FIG. 3C, the light in the first color band 112a illuminates the center portion of the imager panel 110, the light in the second color band 112b illuminates the lower portion of the panel 110 and the light in the third color band 112c illuminates the upper portion of the panel 110.

Figure 3D:
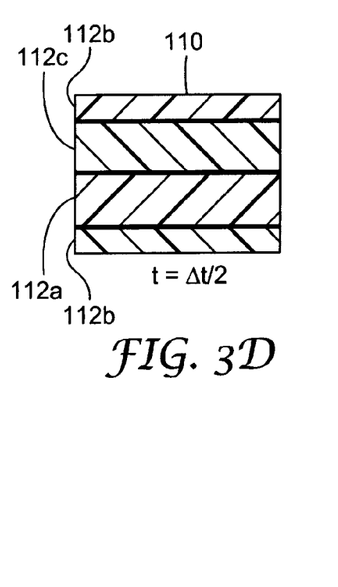

After another interval of Δt/6, i.e. at Δt/2, as shown in FIG. 3D, the area illuminated by the light in the third color band 112c has moved down by about ⅙ from the top of the imager panel 110, the area illuminated by light in the first color band 112a has moved down by around ⅙ of the panel width and the top and bottom portions of the panel 110 are illuminated with light in the second color band. The areas 112a–112c of the differently colored light continue to scroll across the panel 110, the light returning to the top edge of the panel 110 after scrolling off the bottom edge of the panel 110. After a scrolling period of Δt, the panel is illuminated by the same pattern of illumination light as illustrated in FIG. 3A.

Figure 2B:
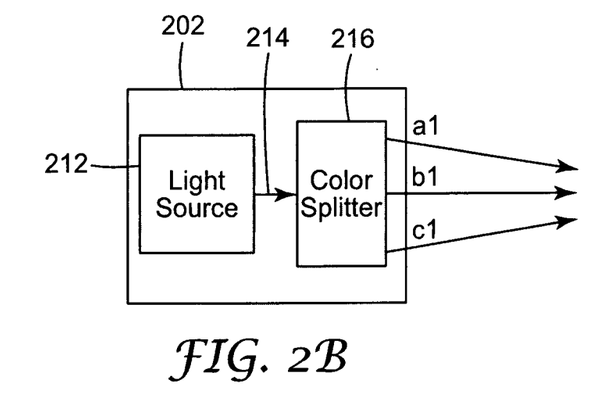
FIGS. 2B and 2C schematically illustrate exemplary embodiments of illumination sources for use in the illumination system of the present disclosure.

Different approaches may be followed for generating light in different color bands that propagate to the prism along the different light paths. For example, as is schematically illustrated in FIG. 2B, the illumination source 202 may include a light source 212 that generates light 214 in a mixture of colors. For example, the light source 212 may generate light 214 comprising all three color bands, such as red, green and blue. The light 214 is split, in a color splitter assembly 216 into different color bands that propagate along the different paths a1, b1, and c1. In such exemplary embodiments, between the light source 212 and the color splitter assembly 216, the light in the different color bands is parallel and coincident. Between the color splitter assembly 216 and the color combiner assembly 206, the light in the different color bands is separated and incident at different angles. After the color splitter assembly 216, in some exemplary embodiments the light in the different color bands propagate once again in parallel directions, but the different color bands are laterally separated from each other.

Figure 2C:
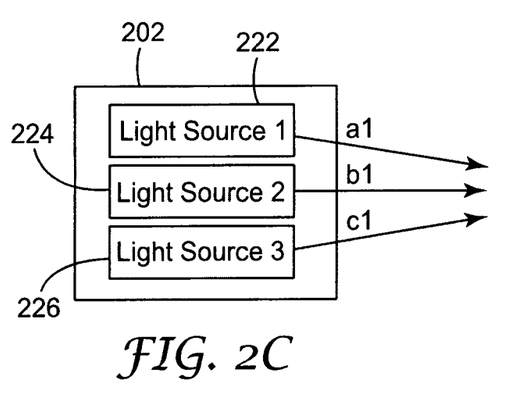

In another approach, schematically illustrated in FIG. 2C, the illumination source 202 may include two or more light sources for generating light in respective color bands. In the illustrated example, light source 1, labeled as element 222, generates light in the first color band and directs the light in the first color band along the first light path, a1. Light source 2, labeled as element 224, generates light in the second color band and directs the light in the second color band along the second first light path, b1. Light source 3, labeled as element 226, generates light in the third color band and directs the light in the third color band along the third light path, c1.

Other approaches may be employed for delivering light in different color bands to the rotatable prism 204. For example, the illumination source 202 may comprise different light sources, where one light source generates light in one of the color bands and another light source generates light in the other two color bands, which is split into differently colored beams propagating along respective optical paths.

The illumination source 202 may also include beam conditioning components, for example to collect and direct the light towards the prism. The beam conditioning components may include, for example, various refractive and/or reflective elements for controlling the divergence of the light from the light source, polarization control elements, such as a polarizers and retardation plates to control the polarization of the light, and an integrator, such as a tunnel integrator to control the uniformity of the light across the beam.

Figure 4:
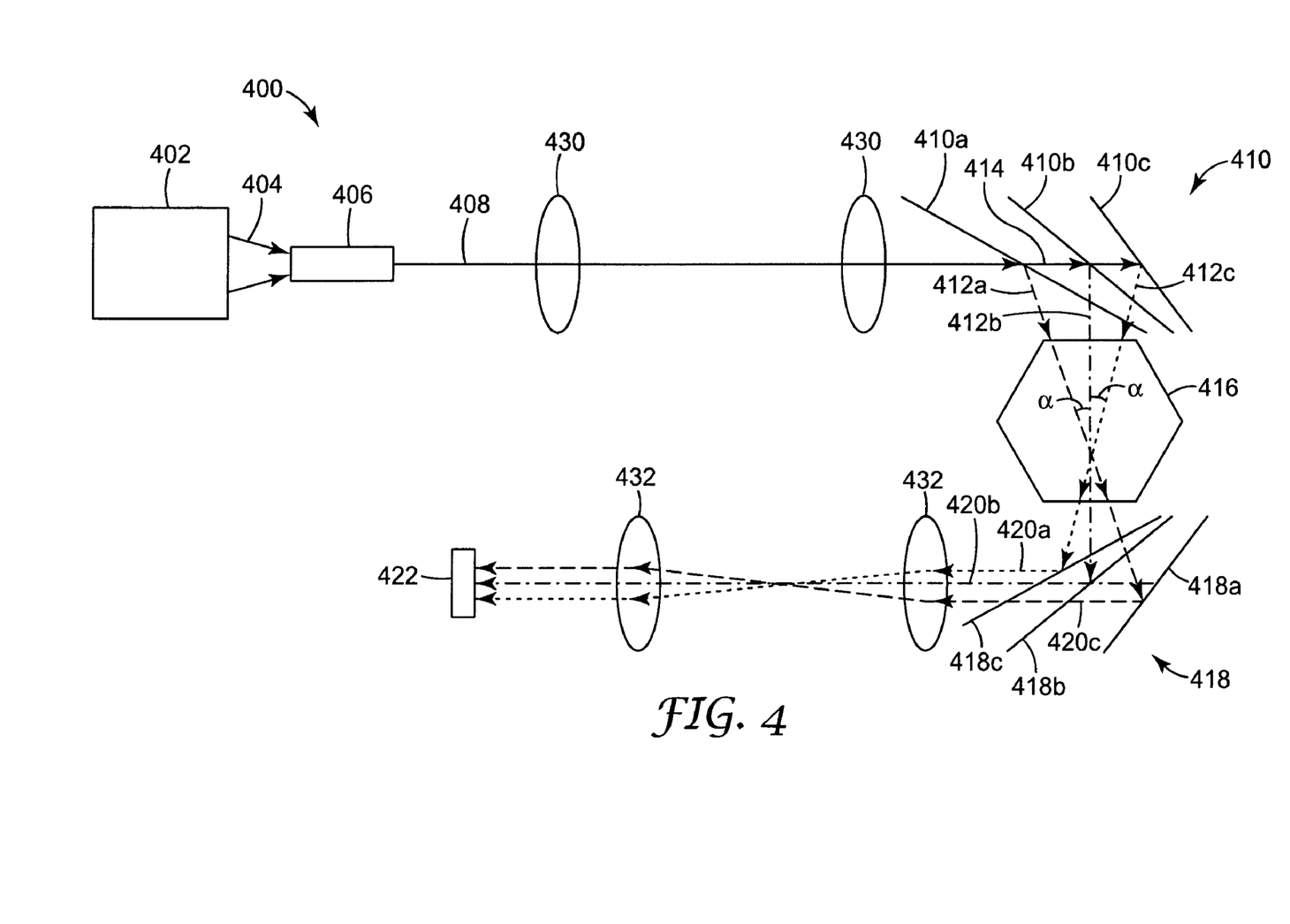
FIG. 4 schematically illustrates another exemplary embodiment of an illumination system according to principles of the present disclosure.

One exemplary embodiment of the present disclosure is schematically illustrated in FIG. 4, which shows an imager illumination system 400 having a light source 402 that generates a light beam 404 including different color bands. The light beam 404 may be referred to as a mixed color light beam. The light beam 404 may be directed into an integrator 406, for example a tunnel integrator, to uniformize the intensity of the illumination beam across its cross-section. The tunnel integrator 406 may have parallel walls, or may be tapered. The uniformized light beam 408 is directed to a color splitter assembly 410 comprising an assembly of reflectors that reflect light in different color bands. The first reflector 410a reflects light 412a in the first color band, shown as a dashed line. The first reflector 410a may be, for example, a dichroic mirror that reflects light in the first color band and transmits light outside the first color band. The remaining light 414 is incident on the second reflector 410b, which reflects light 412b in the second color band. The second reflector 410b may be, for example, a dichroic mirror that reflects light in the second color band and transmits light in the third color band. The light 412c in the third color band that is transmitted through the second reflector 410b is reflected by the third reflector 410c. For exemplary purposes only, the first, second and third color bands may respectively be red, green and blue. It will be appreciated, however, that the first, second and third color bands may include light of different colors. Alternatively, the illumination system can utilize any two of the first, second and third color bands, or it may utilize more than three color bands.

The reflected light 412a, 412b and 412c in the different color bands is incident at the rotatable prism 416 along different paths. The prism 416 may have any suitably shaped cross-section. In the illustrated embodiment, the prism 416 has a hexagonal cross-section, but need not be limited to this shape. For example, the prism 416 may have a square or an octagonal cross-section, or a cross-section of any other suitable shape. The prism 416 may be formed of any suitably transparent material, for example glass or polymer. The use of higher refractive index materials leads to increased refractive power, and so the prism may be made smaller. Examples of suitable glasses include, but are not limited to, flint glasses such as SF 57, available from Schott North America, Inc., Elmsford, N.Y. Examples of suitable polymer materials include, but are not limited to polycarbonates, polymethyl methacrylate (PMMA), and Zeonex®, available from Zeon Corporation, Tokyo, Japan.

Since the reflectors 410a, 410b and 410c lie at different angles to the incident light beam 408, the paths followed by the reflected light 412a, 412b and 412c are not parallel when incident on the prism 416. The angle between light paths 412a and 412b and between the light paths 412b and 412c is shown as α, within the prism 416. The angle between the light paths before entering the prism may be calculated using Snell's law. Typically, the angle between the light paths 412a, 412b and 412c is related to the number of facets on the prism 416. For a hexagonal prism, an exemplary angle between the light paths 412a, 412b and 412c before entering the prism is 20°. Where the prism 416 is octagonal, an exemplary suitable angle between the light paths 412a, 412b and 412c is 15° and is 30° when the prism 416 is square.

After passing through the prism 416, the light is incident at the color combiner assembly 418, which in some exemplary embodiments includes reflectors 418a–418c. In the illustrated embodiment, the light 412c is incident on the first reflector 418c, and is reflected as light beam 420c towards the imager panel 422. The light 412b is transmitted through the first reflector 418c, and is reflected as light beam 420b towards the imager panel 420 by the second reflector 418b. The reflected light beam 420b passes once more through the first reflector 418c after being reflected by the second reflector 418b. The light 412a is transmitted through the first and second reflectors 418b and 418c, is reflected by the third reflector 418a as light beam 420a and is again transmitted through the second and first reflectors 418b and 418c towards the imager panel 422. The three beams 420a–420c may be considered to be components of a single, combined illumination beam that is incident on the imager panel 422.

The angles between the reflected beams 420a–420c propagating from the color combiner assembly 418 are different from the angles between the beams 412a–412c entering the prism. The reason for this is because the reflecting surfaces of the reflectors 418a–418c are non-parallel, and so the different beams 420a–420c are deflected through different angles by the reflectors 418a–418c. In the illustrated embodiment, the reflected beams 420a–420c propagate from the color combiner assembly in directions substantially parallel to each other. However, those of ordinary skill in the art will readily appreciate that the reflected beams 420a–420c may propagate at any suitable angles.

The scrolling assembly may further include one or more image relay systems. A first image relay system 430, for example comprising one, two or more lenses or other optical components, may be used to relay a first image of the output of the integrator 406 to a position proximate the prism 416, including a position within the prism 416. As it rotates, the prism 416 imparts a varying offset of the imaged color stripe. A second image relay system 432, for example comprising one, two or more lenses or other optical components, may be used to relay a second image from the first image plane to the imager panel 422. It will be appreciated that the image relay systems 430 and 432 need not rely only on refractive optics, but may also use reflective or diffractive optics. Furthermore, the magnification of each leg of the relay system may be set to any desired value, and the first image relay system 430 may have a different magnification from that of the second image relay system 432. A polarization converter may also be used in the illumination system 400, for example at the pupil of the illuminator. In addition, various folding optics, such as folding mirrors, prisms, and the like, may be used between the light source and the imager panel so as to reduce the overall size of the illumination system 400.

The sizes of the differently colored areas and the sizes of the dead spaces on the imager panel 422 depends on a number of different factors including, but not limited to, the size of the output aperture of the integrator 406 and the exit pupil of the illumination source, the magnification of the image relay systems, and the magnitude of the lateral offset imparted to light in a particular color band by the prism. For example, where the imager panel 422 has a 16:9 aspect ratio, and there are three different color bands illuminating the imager panel 422 simultaneously, the aspect ratio at the output of the tunnel integrator 406 may be approximately, or just under, 16:3.

In another exemplary embodiment (not illustrated), the imager panel 422 may be illuminated by two different color bands, rather than three different color bands. In such a case, the aspect ratio at the output of the tunnel integrator 406 may be closer to 16:4.5 so as to reduce the size of the dead space.

Figure 5:
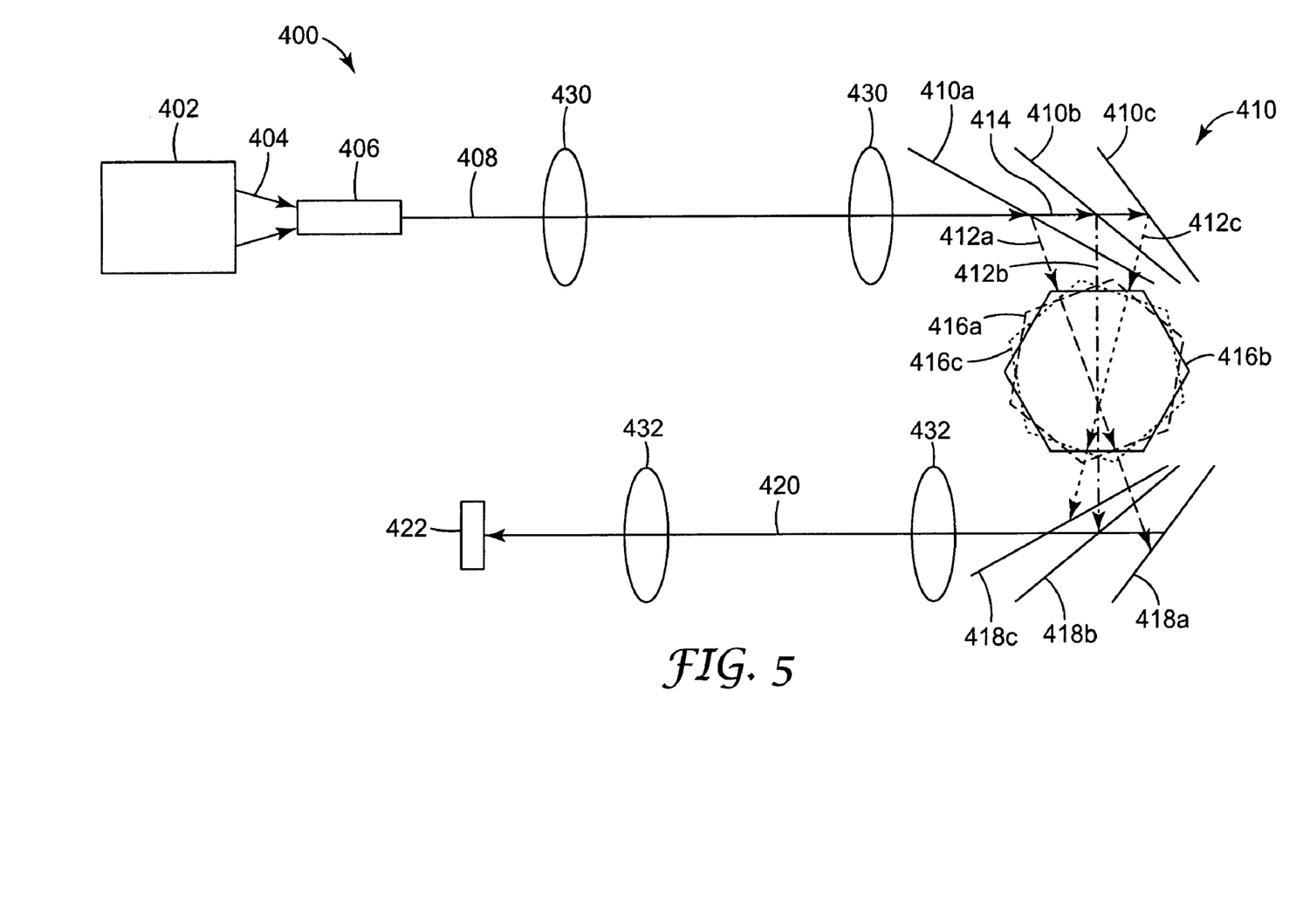
FIG. 5 schematically illustrates operation of the illumination system of FIG. 4 for different prism positions.

Another schematic view of the exemplary illumination system 400 is presented in FIG. 5. In this view, the prism 416 is shown in three different orientations, 416a (dashed line), 416b (solid line) and 416c (dotted line). In each orientation, the prism 416 presents an optical face perpendicular to a respective incoming light beam 412a, 412b and 412c. When each light beam 412a–412c passes through the prism 416 when oriented perpendicularly, each beam 412a–412c illuminates the center portion of the imager panel 422. The perpendicular condition occurs with each beam as the prism 416 rotates, and does not happen simultaneously for all beams 412a–412c at one time. Therefore, the view shown in FIG. 5 is an overlap of "snapshots" taken at different times, and beam 420 represents the spatial overlapping of beams 420a, 420b and 420c when the prism 416 is in the respective perpendicular conditions at different times.

In one example of an illumination system that uses a single scrolling prism, the area of the imager panel is 25.6 mm×14.4 mm, when using a pixel array of 1280×720, at a pixel pitch of 20 μm. In such a case a suitable size for each red, green and blue stripe on the imager panel is approximately 26.2 mm×4.4 mm. This includes dead bands between stripes, and allows for a slight overfill of the imager panel. The center-to-center displacement between stripes is around 4.5 mm, which accounts for dead space and overfill. The illumination system may have an f-number of f/2.8, although other values of f-number may be used. For example, values of f/2.4 or f/2 may be used.

Figure 6:
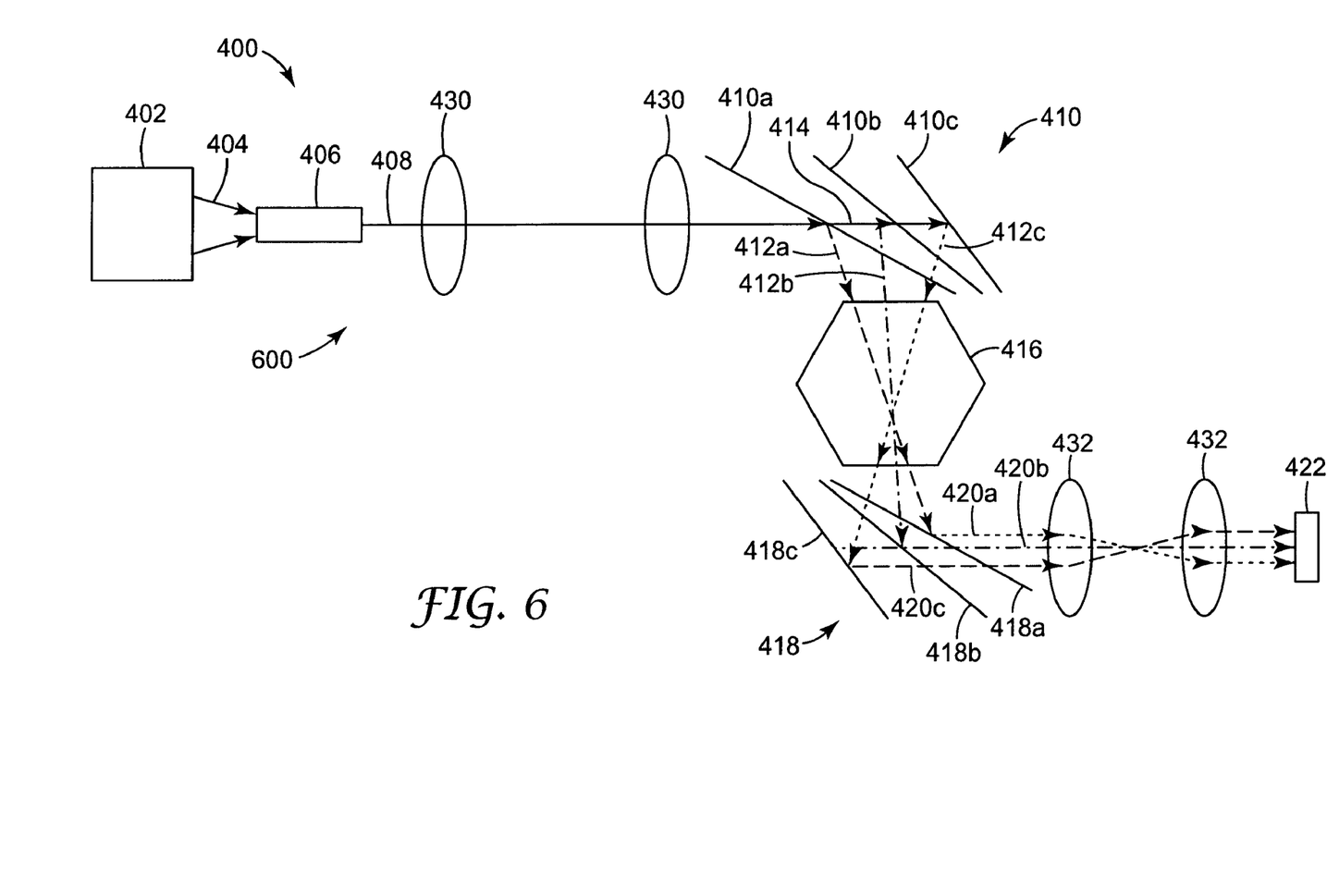
FIG. 6 schematically illustrates another exemplary embodiment of an illumination system according to principles of the present disclosure.

In some exemplary illumination systems, the prism may be formed of PMMA and have a vertex-to-vertex thickness of 45 mm, which translates to a face-to-face thickness of about 39 mm. The double image relay system may have a 1× magnification in each stage and may be formed using PMMA molded aspheric lenses. The focal length of the lenses may be selected to suit the particular system;

The exemplary illumination system 400 need not be folded in the manner shown, where the light 412c is reflected in the color combiner assembly 418 without passing through any of the reflectors 418a–418c. For example, the color combiner assembly 418 may be oriented differently, as is schematically illustrated in the illumination system 600 of FIG. 6, so that the light 412c, reflected in the color combiner assembly 418 as light 420c, passes through the reflectors 418b and 418c.

One important consideration in designing an exemplary illumination system according to the present disclosure is the effective path length of the differently colored light beams. From simple geometrical considerations of the illumination system 400, the light beam 412b has an effective optical path length between the two relay systems 430 and 432 that is shorter than that for the light passing along either of the "tilted" light paths 412a and 412c. Furthermore, the dispersion of optical materials, for example, the lenses in the image relay system, results in chromatic effects. Thus, the first relay system 430 forms image planes in each of the three light beams. The image plane in the blue beam is formed closest along the path from the first relay system, and the image plane in the red light beam is formed farthest away from the first relay system 430. This effect is often referred to as axial color difference, or axial color shift. In the example discussed above, where the image relay lenses 430 have a focal length of about 75 mm, the axial color difference between light at 480 nm and 620 nm is approximately 6 mm.

The particular choice of which color passes along each beam through the prism 416 involves consideration of a number of different factors. In "angular separation" systems, such as the color splitter assembly 410 and color combiner assembly 418, it is known that there is a possibility of creating ghost paths, due to reflection at different optical surfaces. In the color splitter assembly 410 and color combiner assembly 418, each path traverses a number of different plates. In some exemplary embodiments, it is important, therefore, to ensure that little or no unwanted reflected light propagates within the illumination system to degrade the color purity, or to form undesired patches of light. Green may be placed as the center color, although in some embodiments red may be placed as the center channel, to increase transmission. In some cases it may also be useful to place blue as the center color, because the shorter path length for beam 412b may compensate for the shorter distance between the first image relay system 430 and the image plane for the blue light.

Figure 7:
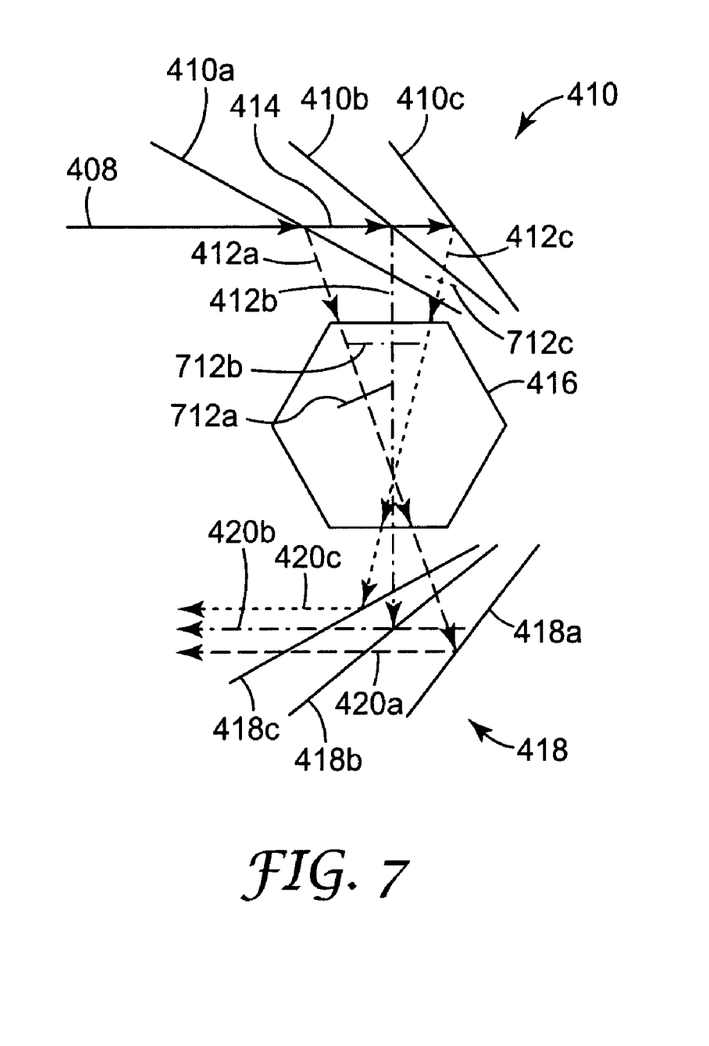
FIG. 7 schematically illustrates positions of image planes of different color beams in the illumination system of FIG. 4.

FIG. 7 schematically shows part of the illumination system 400, indicating the image planes formed in the different beams. In the illustrated embodiment, the red light is in beam 412a, and the red image plane is marked as plane 712a. The green light is in beam 412b and the green image plane is marked as plane 712b. The blue light is in beam 412c and the blue image plane is marked as plane 712c. In the illustrated example, the green image plane 712b is found inside the prism, 416, close to its entrance face, whereas the blue image plane 712c is formed short of the prism 416 and the red image plane 712a is formed inside the prism 416. The exact locations of the differently colored image planes 712a–712c depend on several factors, including the separation between the image relay system 430 and the prism 416, the power and the chromatic aberration of the image relay system 430, and the positions of the reflectors 410a–410c.

It will be appreciated that the different colors may pass along different paths, and the particular arrangement shown in FIG. 7 is not intended to be limiting. For example, the green light may pass along the first path 412a, blue light may pass along the second path 412b and red light may pass along the third path 412c. However, for the description provided below, the convention as shown in FIG. 7 is adopted, where red light passes along the first path 412a, green light passes along the second path 412b and blue light passes along the third path 412c.

Various approaches may be followed to reduce the axial color difference, i.e. to reduce the effective separations between the different image planes. For example, where the paths through the scrolling prism unit, including the color spitting assembly and the color combiner assembly, have different lengths, a longer path may be used for the red light beam, so as to at least partially compensate for the longer distance between the first image relay system and the red image plane.

Figure 8:
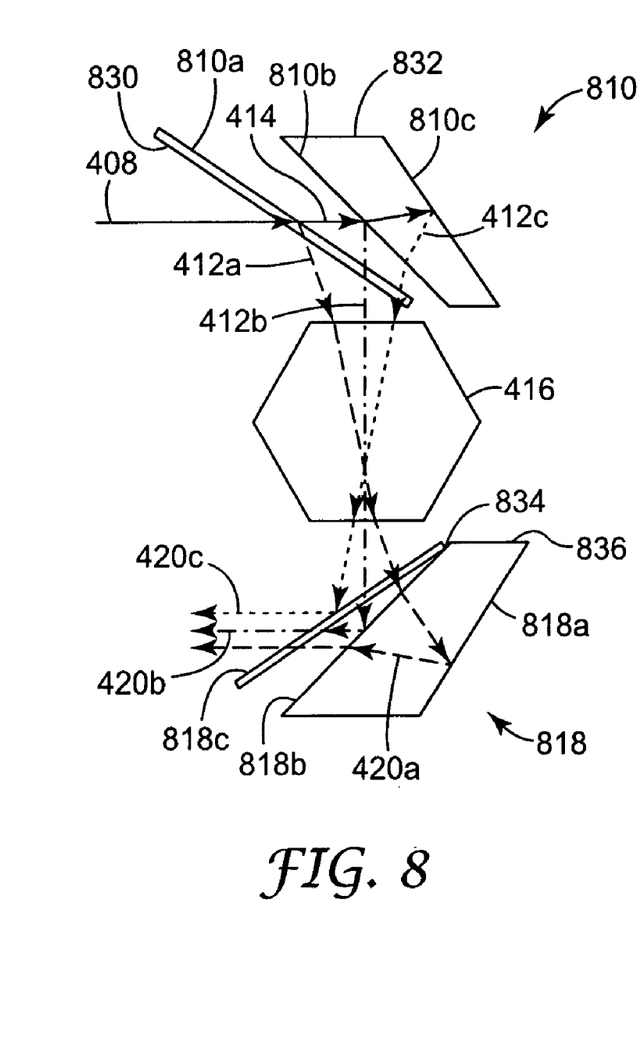
FIG. 8 schematically illustrates exemplary embodiments of a color splitting assembly and a color combining assembly according to principles of the present disclosure.

Another approach is to increase the optical path length for one or more of the different paths. One way of implementing this approach is schematically illustrated in FIG. 8. The reflectors 810a–810c of the color splitting assembly 810 may be mounted on transparent substrates, for example glass substrates. A substrate may be positioned either between the first image relay system and its respective reflector, or between the reflector and the rotating prism. Different substrate positions result in different effects on the optical path lengths for the differently colored beams. In the illustrated embodiment, the first reflector 810a is positioned on the rear surface of a substrate 830, with the result that the red, green and blue light all pass through the substrate 830, the red light passing through the substrate 830 twice. The first reflector 810a may also be positioned on the front surface of the substrate 830, facing the first image relay system 830, so that only the blue and green light pass through the substrate 830.

The second and third reflectors 810b and 810c may also be mounted on their own individual substrates. In another approach, the second and third reflectors 810b and 810c are mounted on different surfaces of a wedged substrate 832. This approach results in the increase in the optical path length for the blue light, without increasing the optical path length for the green light.

The different reflectors 818a–818c of the color combining assembly 818 may be also mounted on substrates. Each reflector 818a–818c may be mounted on its own individual substrate, with the reflector 818a–818c positioned on the front surfaces of the substrates, so that light reflected by reflector does not pass into its respective substrate. Alternatively, one or more of the reflectors 818a–818c may be mounted on the rear surfaces of their respective substrates so that light reflected by the reflectors do pass through their substrates. In the illustrated example, the first reflector 818a is mounted on the front surface of the substrate 834.

In some exemplary embodiments, two of the reflectors may be mounted on different sides of the same substrate. In the illustrated example, the second reflector 818b is on the front side of the substrate 836, while the third reflector 818c is mounted on the rear surface of the substrate 836. The substrate 836 is wedged so that the two reflectors 818b and 818c are disposed at desired angles relative to the incident light beams.

Even with the use of such color path length compensation techniques as discussed above, the light incident on the imager panel may still not be completely focused for all colors. This defocus effect may be caused by incomplete path length compensation for axial color difference, some other path length mismatch and/or astigmatism. The defocus effect on the imager panel typically results in a softening of the edges of the color bands on the imager panel, and if large enough may result in one band of color overlapping into another. A larger dead space between bands may be used to reduce or avoid such overlap if it is found to be undesirable for a particular application.

For a hexagonal prism, the field rate at the imager, that is the number of times a pixel is exposed to light of a new color is equal to eighteen times the rotation rate of the prism. At a typical frame rate of 120 Hz, corresponding to a 360 Hz field rate, the prism spins at 360/18×60=1200 r.p.m. This is a significantly slower rotation rate than is commonly used for color wheels in single panel displays, and may be implemented using a quiet electric motor. Furthermore, the efficiency of light use in an illumination system that uses the scrolling prism of the sort described here is around three times higher than with conventional single panel engines that use a color wheel.

Thus, the systems described herein may be used to provide a simple projection system, based on a single imager panel, while using essentially all of the light from the illumination source. This is expected to lead to simpler, less expensive, more efficient image projection systems.

While the use of three differently colored light beams has been discussed with reference to several of the exemplary embodiments herein, the intention is not to limit the scope of the disclosure to only three beams. For example, in another exemplary embodiment of an illumination system 900, schematically illustrated in FIG. 9, a rotatable prism 916 may be used to scroll two differently colored light beams 912a, 912b across an imager panel 922. The light beams 912a, 912b may be produced in different ways. For example, the light beams 912a, 912b may be obtained from different light sources 910a and 910b, as illustrated, or the light beams 912a, 912b may be obtained from a single light source, for example by splitting light in one color from light of another color.

Figure 9:
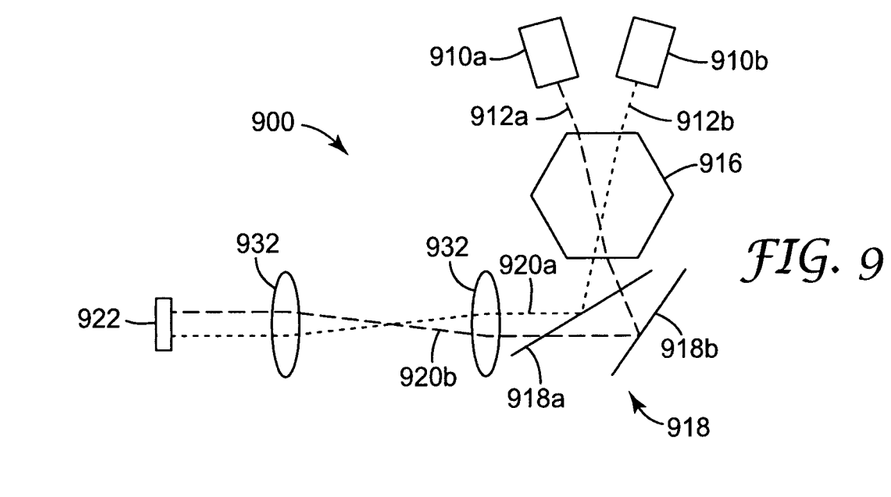
FIG. 9 schematically illustrates another exemplary embodiment of an illumination system according to principles of the present disclosure.

Non-parallel reflectors 918a and 918b direct the beams 912a and 912b along respective and, in this exemplary embodiment, parallel light paths 920a, 920b towards the imager panel 922. An image relay system 932 may be used to relay the light 920a, 920b from the prism 916 to the imager panel 916. A two-color image formed by the imager panel 922 illuminated in this manner may be projected as is, or may be combined with an image of formed using another imager panel. The combined image may be a full color image where the other imager panel forms an image using a color that provides balance to the colors in the light beams 912a and 912b.

Figure 10A:
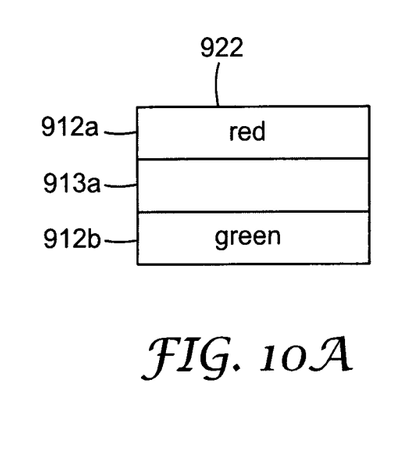
FIGS. 10A–10D schematically illustrate scrolling band of different color across an imager panel in an illumination system of the type schematically illustrated in FIG. 9.
Figure 10B:
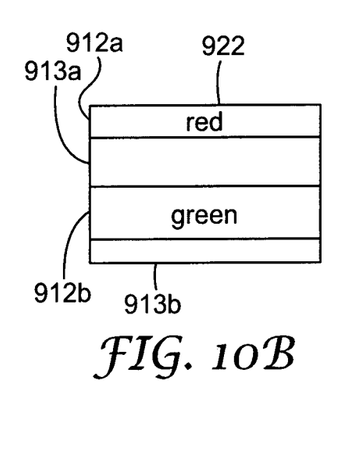
Figure 10C:
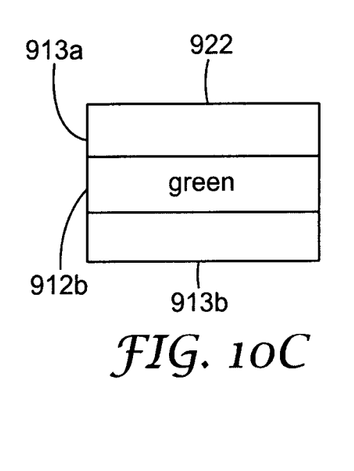
Figure 10D:
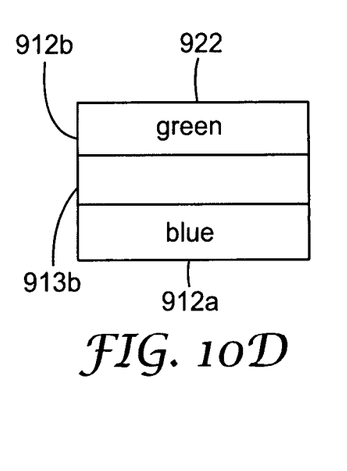

Another exemplary embodiment of the disclosure is now described with further reference to FIG. 9 and also to FIGS. 10A–10D. One or both of the light beams may be switchable between two different colors. In the illustrated exemplary embodiment, the first light beam 912a is switchable between red and blue. Such a light beam may be produced, for example, using a light source 910a that includes red and blue light emitting diodes. In this exemplary embodiment, the light beam 912a contains light of only one color at any one time, and the color may be switched to a different color upon starting a new scan across the imager panel 922. FIG. 10A schematically shows the illumination of the light panel 922 at a certain point in time with the first beam 912a being red and the second beam 912b being green, with a dead space 913a between the first and second beams 912a and 912b. A short time later, schematically shown in FIG. 10B, the beams 912a and 912b have scrolled upwards, and so only part of the first beam 912a illuminates the imager panel 922 with red light and a second dead space 913b scrolls up from the bottom of the panel 922. A short time later, as schematically shown in FIG. 10C the first beam 912a has scrolled off the imager panel 922 leaving only the second beam 912b illuminating the imager panel 922. The second light beam 912b continues to scroll upwards across the imager panel 922 while the first beam 912a starts to illuminate the imager panel 922 from its bottom edge. On this pass across the imager panel 922, the first light beam 912a is switched to blue light. FIG. 10D schematically shows the illumination pattern on the imager panel 922 after the (blue) first light beam 912a has scrolled its full height onto the imager panel 922. The two light beams 912a and 912b continue to scroll across the imager panel 922. In this exemplary embodiment, a single imager panel may be used to produce a full color image while only being illuminated with up to two light beams at any one time.

It will be appreciated that the second light beam 912b may also be switched between two different colors. In such a case, the full color image may be formed from four differently colored images. The use of four colors, rather than three colors, to form the full color image may provide increased control over color balance.

The present invention should not be considered limited to the particular examples described above, but rather should be understood to cover all aspects of the present disclosure as fairly set out in the attached claims. Various modifications, equivalent processes, as well as numerous structures to which the present disclosure may be applicable will be readily apparent to those of ordinary skill in the art to which the present disclosure is directed upon review of the present specification. The claims are intended to cover any such modifications and devices.

What is claimed is:

1. An image projection device, comprising:
   a scrolling prism assembly comprising a rotatable prism arranged to receive light in at least two different color bands, the light in the at least two different color bands being incident at the rotatable prism along respectively different light paths;
   an imager panel disposed to receive light in the at least two different color bands along the respectively different light paths simultaneously from the scrolling prism assembly; and
   a reflective color combiner assembly disposed on the different light paths between the scrolling prism assembly and the imager panel, the color combiner assembly receiving light at an input side from the rotatable prism, light passing from an output side of the reflective color combiner assembly towards the imager panel, angular separations between the different light paths at the input side of the reflective color combiner assembly being different from angular separations between the different light paths at the output side of the reflective color combiner assembly, wherein the difference in angular separations between the different light paths is introduced via reflection.

2. A device as recited in claim 1, wherein the light in the at least two different color bands is directed along the respectively different light paths in respectively different directions at the rotatable prism.

3. A device as recited in claim 1, wherein the color combiner assembly comprises a stack of planar reflectors arranged with reflecting surfaces non-parallel to each other.

4. A device as recited in claim 3, wherein the non-parallel reflectors are arranged so that the light in the different color bands would propagate along a single output axis from the color combiner assembly towards the imager panel if the rotatable prism were to be removed.

5. A device as recited in claim 3, wherein light from the rotatable prism in a first of the color bands is reflected by a first reflector, closest to the rotatable prism, and light from the rotatable prism in at least one color band other than the first color band is transmitted through the first reflector.

6. A device as recited in claim 5, wherein light from the rotatable prism in a second color band is transmitted through the first reflector, is reflected by a second reflector, and is again transmitted through the first reflector after being reflected by the second reflector.

7. A device as recited in claim 6, wherein light from the rotatable prism in a third color band is transmitted through the first and second reflector, is reflected by a third reflector and is again transmitted through the first and second reflectors after being reflected by the third reflector.

8. A device as recited in claim 1, further comprising an illumination source capable of generating the light in the at least two different color bands incident at the rotatable prism along the respectively different light paths.

9. A device as recited in claim 8, wherein the illumination source comprises a light source capable of generating a beam of mixed light comprising wavelengths of more than one color band.

10. A device as recited in claim 9, further comprising a color separating assembly to separate the beam of mixed light into respective beams of light of the at least two different color bands, the color separating assembly arranged to direct the respective beams of light of the different color bands to the rotatable prism along the respectively different light paths.

11. A device as recited in claim 10, wherein the color separating assembly comprises at least two reflectors disposed to respectively deflect light in the at least two color bands towards the rotatable prism along the respectively different light paths, at least one of the reflectors reflecting light in one color band and transmitting light outside that one color band.

12. A device as recited in claim 11, wherein the light in the at least two different color bands enters the color separating assembly along a single input axis and is directed out from the color separating assembly along different output axes for the respectively different light paths, the different output axes being non-parallel.

13. A device as recited in claim 11, wherein the illumination source is capable of generating a beam of mixed light comprising at least three color bands and the at least two reflectors comprise three reflectors respectively associated with the three color bands, a first reflector reflecting incident light in a first color band and transmitting incident light in a second and a third color band, a second reflector reflecting the light in the second color band transmitted through the first reflector and transmitting light in the third color band transmitted through the first reflector, and a third reflector reflecting light in the third color band transmitted through the first and second reflectors.

14. A device as recited in claim 13, wherein the light in the third color band is transmitted through the second and first reflectors after being reflected by the third reflector and the light in the second color band is transmitted through the first reflector after being reflected by the second reflector.

15. A device as recited in claim 9, further comprising beam conditioning optics to condition the beam of mixed light, the beam conditioning optics comprising at least one of an integrator, one or more divergence-controlling elements and one or more polarization controlling elements.

16. A device as recited in claim 15, wherein the integrator has an output aspect ratio of approximately 16:3.

17. A device as recited in claim 15, wherein the beam conditioning optics comprise an integrator and divergence-controlling elements comprising a first image relay system that relays images of an output from the integrator to respectively different first image planes, associated with the different color bands, proximate the rotatable prism.

18. A device as recited in claim 17, further comprising a second image relay system that relays first images formed at the respectively different first image planes to the imager panel as second images.

19. A device as recited in claim 1, wherein the light in the different color bands instantaneously illuminates different portions of the imager panel, the different color bands scrolling across the imager panel when the rotatable prism rotates.

20. A device as recited in claim 1, wherein the light in the at least two different color bands passes through at least two respective image planes proximate the rotatable prism, and further comprising an image relay system that relays images from the respective image planes to the imager panel.

21. A device as recited in claim 1, wherein the at least two different color bands comprise red, green and blue color bands.

22. A device as recited in claim 1, wherein the rotatable prism has a hexagonal cross-sectional shape.

23. A device as recited in claim 1, wherein the imager panel comprises one of a liquid crystal display (LCD) imager panel and an array of individually addressable, rotatable reflecting elements.

24. A device as recited in claim 1, further comprising a screen and a projection lens system disposed to project an image received from the imager onto the screen.

25. A device as recited in claim 1, further comprising a controller coupled to control the imager.

26. A method of illuminating an imager panel, comprising:
    passing light beams of at least two different color bands along respectively different paths to a rotatable prism;
    transmitting the light beams of the different color bands through the rotatable prism;
    reflecting the transmitted light beams in the different color bands through different angles so as to reduce angular separations between light beams of the different color bands, wherein the difference in angular separations between the different light paths is introduced via reflection, and
    illuminating the imager panel with the reflected light beams.

27. A method as recited in claim 26, further comprising splitting a mixed light beam into different light beams corresponding to the different color bands and directing the split light beams in the different color bands to the rotating prism.

28. A method as recited in claim 26, wherein reflecting the transmitted light beams comprises reflecting the transmitted light beams using respective reflectors, the reflectors having respective reflecting surfaces that are non-parallel to each other.

29. A method as recited in claim 28, further comprising reflecting light in a first color band at a first reflector and transmitting light in a second color band through the first reflector to a second reflector, and reflecting the light in the second color band through the first reflector.

30. A method as recited in claim 26, further comprising generating light in the different color bands in a single light beam and separating the single light beam into the light beams of the different color bands.

31. A method as recited in claim 30, wherein separating the single light beam comprises passing the single light beam into an assembly of reflectors for reflecting light at respective color bands.

32. A method as recited in claim 30, further comprising passing the single light beam through an integrator.

33. A method as recited in claim 32, wherein the integrator has an output aspect ratio of approximately 16:3.

34. A method as recited in claim 32, further comprising imaging an output from the integrator to respectively different first image planes, associated with the different color bands, proximate the rotatable prism.

35. A method as recited in claim 34, further comprising imaging from the respective first image planes to the imager panel.

36. A method as recited in claim 26, further comprising rotating the rotatable prism so as to scroll illuminated regions related to the at least two different color bands across the imager panel.

37. A method as recited in claim 26, further comprising imposing an image on light incident on the imager panel.

38. A method as recited in claim 36, wherein imposing the image comprises selectively polarization modulating portions of the light incident on the imager panel.

39. A method as recited in claim 36, wherein imposing the image comprises selectively reflectively directing portions of the light incident on the imager panel along a preferred direction.

40. A method as recited in claim 36, further comprising projecting the image to a screen.

41. An illumination system, comprising:
    an illumination source producing an output beam of light in at least two different color bands; and
    a rotatable prism assembly arranged to receive light in the different color bands, the rotatable prism assembly including a color splitting assembly to split the light into different light beams corresponding to the different color bands, a rotatable prism disposed to receive the different color bands and a color combiner assembly receiving the different light beams after passing through the rotatable prism and combining the different light beams to produce a combined beam, the output beam of light being subject to a wavelength-dependent aberration, and the rotatable prism assembly at least partially compensating for the wavelength-dependent aberration, the wavelength dependent aberration being an axial color difference in which an image plane for light of a first color is at a first optical distance from an input plane of the rotatable prism assembly and an image plane for light of a second color is at a second optical distance from the input plane, the second distance being greater than the first distance.

42. A system as recited in claim 41, wherein the illumination source comprises a light source producing the output beam and a first image relay system relaying the output beam to the rotatable prism assembly.

43. A system as recited in claim 42, further comprising a tunnel integrator disposed between the light source and the image relay system, the image relay system relaying an image of an output from the tunnel integrator.

44. A system as recited in claim 42, further comprising a second image relay system, first images formed by the first image relay system being relayed by the second image relay system to an imager panel.

45. A system as recited in claim 41, wherein an optical path length through the rotatable prism assembly is greater for the light of the second color than for the light of the first color.

46. A system as recited in claim 41, wherein at least one of the first color splitting assembly and the color combiner assembly comprises an arrangement of at least first and second reflectors, the first and second reflectors being mounted on a common substrate.

47. A system as recited in claim 46, wherein the first reflector is mounted on a first side of the substrate and the second reflector is mounted on a second side of the substrate, different from the first side.

48. A system as recited in claim 41, further comprising an imager panel disposed to receive light form the rotatable prism assembly, the light in the different color bands instantaneously illuminating different portions of the imager panel, the light in different color bands scrolling across the imager panel when the rotatable prism rotates.

49. A system as recited in claim 48, wherein the imager panel comprises one of a liquid crystal display (LCD) imager panel and an array of individually addressable, rotatable reflecting elements.

50. A system as recited in claim 41, wherein the rotatable prism has a hexagonal cross-sectional shape.

51. A system as recited in claim 41, further comprising a projection lens system disposed to project an image received from the imager.

52. A system as recited in claim 41, further comprising a controller coupled to control the imager.

53. An image projection device, comprising:
an imager panel; and
a rotatable prism assembly disposed to receive input light in at least two different color bands, the rotatable prism assembly comprising color splitting means for splitting the input light into at least two different light beams corresponding to the at least two different color bands, a rotatable prism disposed to transmit the at least two different light beams and a color combining means for receiving the at least two different light beams after passing through the rotatable prism and combining the at least two different light beams to produce a combined beam, the input light being subject to a wavelength-dependent aberration comprising image planes of the two light beams being at different respective distances from an input plane of the rotatable prism assembly, and the rotatable prism assembly further comprising aberration correcting means for at least partially compensating the wavelength-dependent aberration.

54. An image projection device, comprising:
an imager panel; and
a scrolling prism assembly comprising a rotatable prism and a beam combining assembly, at least first and second light beams passing through the rotatable prism to the beam combining assembly, the beam combining assembly directing the at least first and second light beams towards the imager panel, the first light beam being switchable between at least first and second color bands so that the first light beam, containing light in the first color band, is scrolled by the rotatable prism across the imager panel and is subsequently scrolled across the imager panel by the rotatable prism when containing light in the second color band.

55. A device as recited in claim 54, wherein the first light beam is generated by a first light source switchable between the at least two color bands.

56. A device as recited in claim 54, wherein the beam combining assembly comprises at least two reflectors disposed non-parallel to each other.

57. A device as recited in claim 54, wherein the first and second light beams propagate in parallel directions from the beam combining assembly towards the imager panel.

58. A device as recited in claim 54, wherein the first and second light beams enter the rotatable prism along first and second non-parallel optical paths.

59. A device as recited in claim 54, wherein the imager panel comprises one of a liquid crystal display (LCD) imager panel and an array of individually addressable, rotatable reflecting elements.

60. A device as recited in claim 54, further comprising a screen and a projection lens system disposed to project an image received from the imager panel onto the screen.

61. A device as recited in claim 54, further comprising a controller coupled to control the imager panel.

62. An image projection device, comprising:
a scrolling prism assembly comprising a rotatable prism arranged to receive light in at least two different color bands, the light in the at least two different color bands being incident at the rotatable prism along respectively different light paths;
an imager panel disposed to receive light in the at least two different color bands along the respectively different light paths simultaneously from the scrolling prism assembly; and
a reflective color combiner assembly disposed on the different light paths between the scrolling prism assembly and the imager panel, the color combiner assembly receiving light at an input side from the rotatable prism, light passing from an output side of the reflective color combiner assembly towards the imager panel, angular separations between the different light paths at the input side of the reflective color combiner assembly being different from angular separations between the different light paths at the output side of the reflective color combiner assembly, wherein the color combiner assembly comprises a stack of planar reflectors arranged with reflecting surfaces non-parallel to each other.

* * * * *

UNITED STATES PATENT AND TRADEMARK OFFICE
CERTIFICATE OF CORRECTION

| | | |
|---|---|---|
| PATENT NO. | : 7,147,332 B2 | |
| APPLICATION NO. | : 10/895705 | |
| DATED | : December 12, 2006 | |
| INVENTOR(S) | : Arlie R. Conner | |

It is certified that error appears in the above-identified patent and that said Letters Patent is hereby corrected as shown below:

In Column 7, line 52, delete "system;" and insert -- system. -- therefor.

In Column 14, line 67, in claim 48, delete "form" and insert -- from --, therefor.

Signed and Sealed this

Third Day of April, 2007

JON W. DUDAS
*Director of the United States Patent and Trademark Office*